United States Patent [19]
Bruins et al.

[11] Patent Number: 5,432,559
[45] Date of Patent: Jul. 11, 1995

[54] SELF-ADJUSTING WINDOW CIRCUIT WITH TIMING CONTROL

[75] Inventors: Bryan Bruins, Waterdown; Paul Moore, Burlington, both of Canada

[73] Assignee: Gennum Corporation, Burlington, Canada

[21] Appl. No.: 149,258

[22] Filed: Nov. 9, 1993

[51] Int. Cl.$^6$ .......................... H04N 5/08; H04N 5/10
[52] U.S. Cl. ................................. 348/525; 348/533; 348/530
[58] Field of Search .................. 348/525–535, 348/139, 536, 537, 540, 541, 542, 543, 544, 545, 546; H04N 5/08, 5/010

[56] References Cited

U.S. PATENT DOCUMENTS

| | | | |
|---|---|---|---|
| 3,492,424 | 1/1970 | Hare | 348/546 |
| 4,237,487 | 12/1980 | Ikeda et al. | 348/528 |
| 4,445,092 | 4/1984 | Yoshinaka et al. | 348/533 |
| 4,694,256 | 9/1987 | Kawamura | 348/533 |
| 4,722,004 | 1/1988 | Miyamoto et al. | 348/529 |
| 4,792,852 | 12/1988 | Narusawa | 348/530 |

*Primary Examiner*—James J. Groody
*Assistant Examiner*—Michael H. Lee
*Attorney, Agent, or Firm*—Berkeskin & Parr

[57] ABSTRACT

A self-adjusting window circuit suitable for fabrication as a monolithic integrated circuit. The self-adjusting window circuit comprises an input port, a positive edge detector coupled to the input port, a latch coupled to the output of the edge detector and a charging stage coupled to the latch. The input signal comprises a signal having a sequence of pulses appearing at a predetermined scan rate, for example, a composite video signal. The input port feeds the input signal to the edge detector which produces a pulse output signal in response to detecting a pulse in the input signal. The pulse output from the edge detector is latched and used to generate a charging control signal which controls the charging stage. In response to the charging control signal, the charging stage produces a window control signal for a predetermined period. The circuit includes a feedback network which injects the window control signal into the positive edge detector so that the positive edge detector is disabled while the window control signal is active.

15 Claims, 7 Drawing Sheets

SELF-ADJUSTING WINDOW CIRCUIT WITH TIMING CONTROL

FIELD OF THE INVENTION

This invention relates to a pulse detection circuit. More particularly, the present invention relates to a self-adjusting window circuit with timing control, which is suitable for use in a monolithic integrated video sync separator circuit.

BACKGROUND OF THE INVENTION

Video signals, especially those which are transmitted by satellite, can be corrupted by impulse noise. The impulse noise can appear on the video signal as one or more pulses. These noise pulses cause problems if they resemble the synchronization component of the video signal. The noise pulse is sliced by the sync separator and will produce erroneous timing information. While there are known systems which have attempted to solve this problem, there is a need for circuitry which can reject this type of interference. Furthermore, such a circuit should be amenable to fabrication as a monolithic integrated circuit.

It is known that modern silicon processes which are used for producing monolithic integrated circuits do not provide good control of integrated capacitors. Typically, known processes will produce a tolerance of ±20%. One approach to solving this tolerance problem involves designing circuits that depend on ratios of capacitors instead of their absolute values. However, many circuits do not lend themselves to such design parameters and therefore are still affected by variance in the tolerances associated with the silicon processes. Accordingly, there is a need for a circuit which improves the dependence on the tolerance of absolute capacitor values.

BRIEF SUMMARY OF THE INVENTION

In a first aspect, the present invention provides a self-adjusting window circuit suitable for fabrication as a monolithic integrated circuit, said self-adjusting window circuit comprising: (a) input port means for receiving a sync pulse signal having a sequence of pulses appearing at a predetermined scan rate; (b) positive edge detector means coupled to said input port means and having means for producing a pulse output signal in response to detection of a pulse in said input sync pulse signal; (c) latching means for latching said pulse output signal and producing a charging control signal; (d) a charging stage coupled to said latching means and having means responsive to said charging control signal for producing a window control signal in response to said pulse being detected; (e) feedback means for coupling said window control signal to said positive edge detector means and said positive edge detector means having means for disabling and enabling operation of said positive edge detector in response to said window control signal.

A feature of the self-adjusting window circuit according to the present invention is that the circuit is suited for application in a monolithic integrated circuit, for example a video circuit. The self-adjusting window circuit according to the present invention also features a good rejection of impulse noise and the detection of missing pulses.

In a second aspect, the present invention provides a timing control circuit which provides a reference timing signal that can be used to improve the tolerance of parameters that rely on absolute capacitor values.

BRIEF DESCRIPTION OF THE FIGURES

For a better understanding of the present invention, and to show more clearly how it may be carried into effect, reference will now be made, by way of example, to the accompanying drawings which show preferred embodiments of the present invention, and in which.

DETAILED DESCRIPTION OF THE PREFERRED EMBODIMENTS

Figure 1:
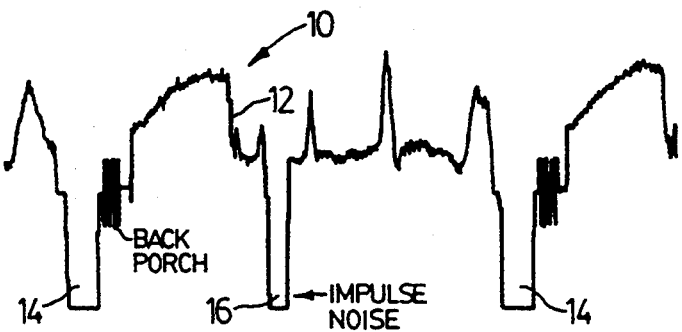
FIG. 1 shows a typical composite video signal with impulse noise.

Reference is first made to FIG. 1 which shows a typical composite video signal 10, for example an NTSC video signal. In known manner the composite video signal 10 comprises an active video signal component 12 and a synchronization signal component 14. In the NTSC standard, the synchronization signal component 14 includes the horizontal and vertical blanking information and additional information in a back porch portion. The composite video signal 10 shown in FIG. 1 has been corrupted by impulse noise which is indicated by reference 16. Video signals, especially those transmitted by satellite, are susceptible to impulse noise. As shown in FIG. 1, the impulse noise appears as a noise pulse 16. If the noise pulse(s) 16 resembles the synchronization signal component 14, the signal 10 can be corrupted and result in erroneous timing information when the signal 10 is received and processed.

In the following description, a composite video signal 10 according to the NTSC standard is considered, however the description is also applicable to other video standards.

In known manner, the video signal 10 is fed into a video picture-scanning circuit (not shown). One of the functions of the picture-scanning circuit is to extract the video synchronization signal components 14, such as horizontal and vertical synchronization signals from the composite video signal 10. The horizontal and vertical sync signals (and back porch and odd/even field signals) are used by the picture-scanning circuit to control the display of the video component 12 of the signal 10 which is received, as will be understood by one skilled in the art.

To extract the video synchronization signals, the picture-scanning circuit (not shown) includes a sync separator circuit. The primary function of the sync separator is to separate (or slice) the synchronization signals 14 from the composite video signal 10. It will be appreciated that the noise pulses 16 (FIG. 1) cause problems because they can be erroneously detected (i.e. "sliced") by the sync separator as synchronization signal components 14. This results in erroneous timing and synchronization information being generated as the composite video signal 10 is being processed by the picture-scanning circuit.

Figure 2:
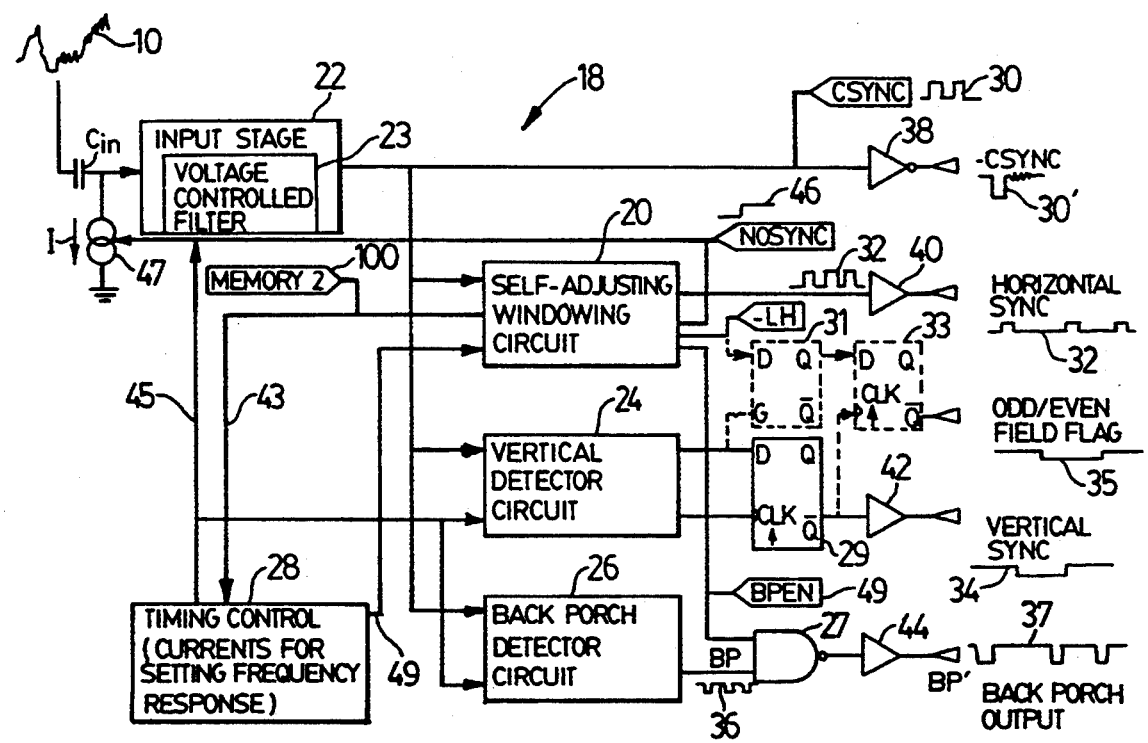
FIG. 2 shows in block diagram form a sync separator which incorporates a self-adjusting window and timing control circuit according to the present invention.

Reference is made to FIG. 2 which shows a sync separator 18 incorporating a self-adjusting window circuit according to the present invention indicated generally by reference 20. The sync separator 18 comprises the self-adjusting window circuit 20, an input stage 22, a vertical detector circuit 24, a "back porch" detector circuit 26, and a timing control circuit 28. As shown, the vertical detector circuit 24 is coupled to a D-type (clocked) flip-flop 29.

The input stage 22 accepts the composite video signal 10 and strips the active video portion 12 to produce a composite sync output signal 30. As shown in FIG. 2, the composite video signal 10 is "AC coupled" to the input stage 22 through an input capacitor $C_{in}$. Since the frequency distribution of the horizontal and vertical control signals is different, the sync separator 18 can filter and process the composite sync signal 30 to regenerate the various synchronization signals. The sync separator 18 shown in FIG. 2 produces a horizontal sync output signal, 32, a vertical sync output signal 34, and a back porch output pulse 37 or BP′.

It will be appreciated that the polarity of the composite sync 30 can be changed from active high to active low by performing a simple inversion, and the active level, i.e. high or low, of a signal is a typically a matter of preference which depends on the associated video processing circuitry or picture scanning circuitry.

As shown in FIG. 2, the input stage 22 is coupled to an output driver 38. The output driver 38 buffers and inverts the composite sync output signal 30 to produce an inverted composite sync output signal 30′ or −CSYNC. In addition, the sync generator 18 includes an output driver 40 for the output from the self-adjusting window circuit 20, an output driver 42 for the vertical detector circuit 24, and an output driver 44 for the back porch detector circuit 26. The output driver circuits 38 to 44 can be implemented in known manner as buffers (or inverters) according to monolithic integrated circuit fabrication techniques.

The vertical detector circuit 24 and the back porch detector circuit 26 can also be implemented using known techniques as will be within the understanding of one skilled in the art. The back porch detector circuit 26 produces the back porch pulse 36, and the vertical detector circuit produces the vertical sync signal 34. Furthermore, with the addition of two "D-type" flip-flops 31,33 (shown in broken outline form), an odd-/even output flag 35 can be generated, which indicates the odd and even fields that are interlaced in known manner to produce an NTSC video image.

The self-adjusting window circuit 20 produces a WINDOW signal 48 (FIG. 3) which is used to produce a "window" within which to detect the synchronization signal component 14. The purpose of the "window" is to alleviate the effects of impulse noise in the composite video signal 10 (see noise pulse 16 in FIG. 4). In addition, the window circuit 20 according to the present invention produces a NOSYNC signal output 46, a backporch enable signal 49 or BPEN, and a MEMORY2 signal 100 (see below).

The NOSYNC signal 46 is used to indicate certain fault conditions which are detected in the composite sync signal 30 by the self-adjusting window circuit 20, as will be described below. In addition, the NOSYNC signal 46 can be used in conjunction with a current source 47 to restore the input stage 22 to a known state subsequent to the occurrence of a fault condition. As shown in FIG. 2, the current source 47 is coupled to the input stage 22 and the NOSYNC signal 46 operates as a control input for the current source 47. The NOSYNC signal 46 is used to turn on the current source 47 in order to discharge the coupling capacitor $C_{in}$ on the input stage 22, as will be described with respect to FIGS. 6 and 7 below.

Figure 4:
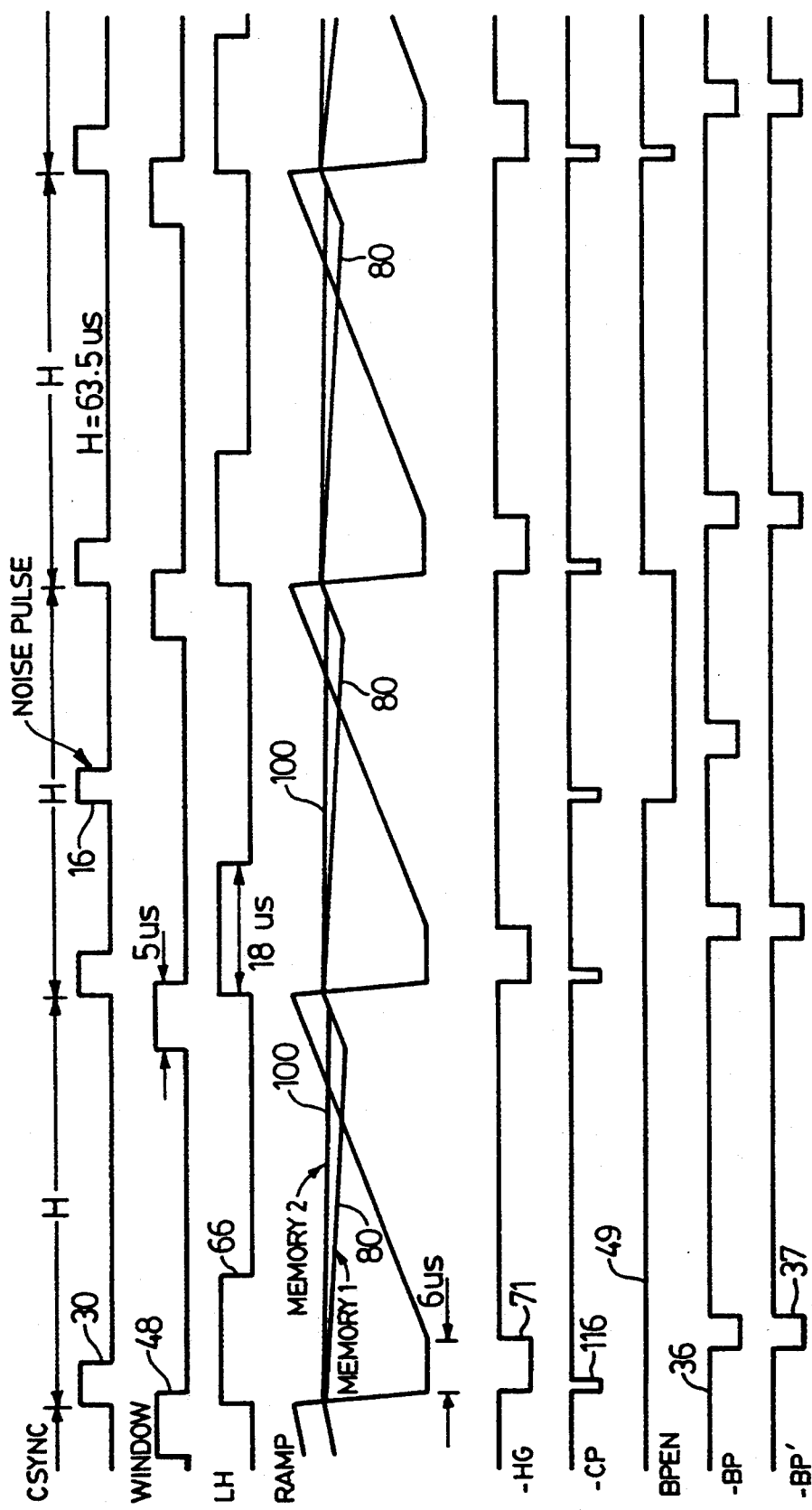
FIG. 4 is a timing diagram which shows the relationship between various signals for the self-adjusting window circuit of FIG. 2.
Figure 5:
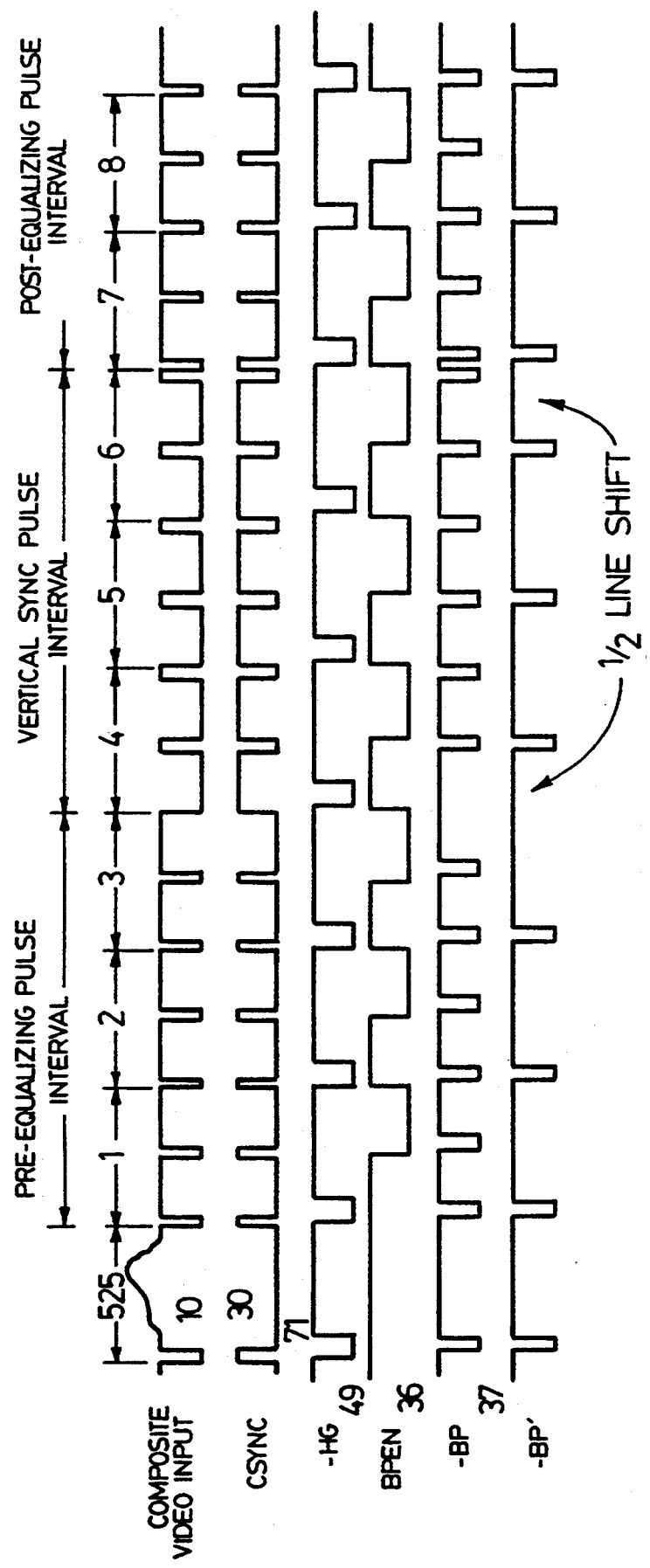
FIG. 5 is a timing diagram showing the relationship of the signals in FIG. 4 over a vertical blanking interval of the video signal.

Referring still to FIG. 2, the backporch enable signal 49 is "ANDED" (using an AND gate 27) with the back porch pulse 36 (i.e. the output of the backporch detector circuit 26) to produce a backporch output pulse 37 or BP′, which is in sync with the start of each horizontal line. The relationship between the backporch output pulse 37 and the other signals is shown in FIGS. 4 and 5.

As shown in FIG. 2, the timing control circuit 28 has an input 43 and an output 45. The input 43 is connected to the MEMORY2 signal 100 which is produced by the self-adjusting window circuit 20. The output 45 is coupled to a voltage controlled filter 23 in the input stage 22. The operation of the MEMORY2 signal 100 and the timing control block 28 in relation to the input stage 22 will be described below with respect to FIG. 8. As shown in FIG. 2, the timing control block also has an output which is coupled to the window circuit 20. The output indicated by reference 49 supplies a current for setting the frequency response of the window circuit 20 as described below with reference to current source 78 in FIG. 3. As shown in FIG. 2, the output 45 from the timing control block 28 is also connected to the vertical detector circuit 24 and the back porch detector circuit 26 in order to provide a similar timing control function as described below.

Figure 3:
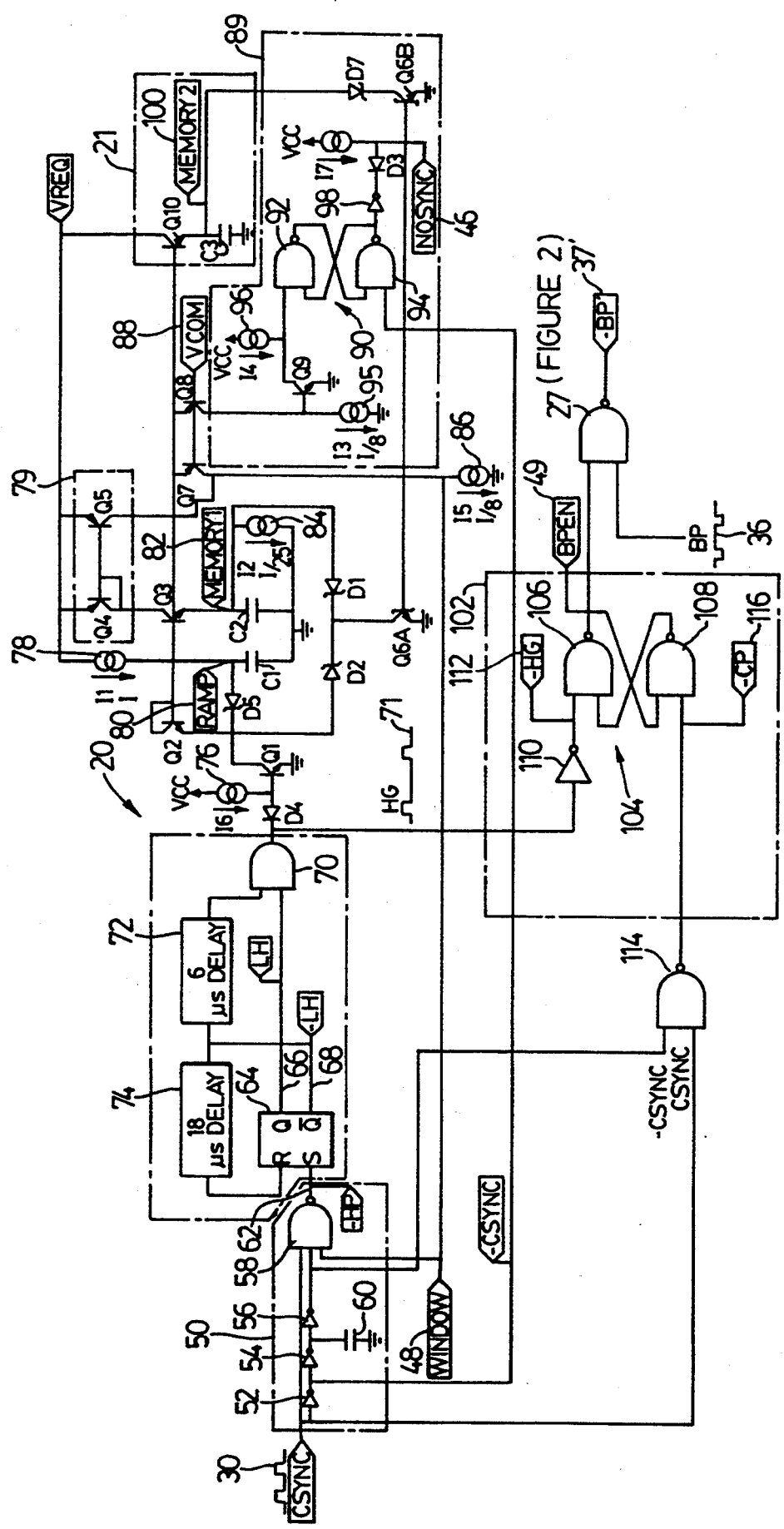
FIG. 3 is a schematic diagram which shows in more detail the self-adjusting window circuit with timing control of FIG. 2 according to the present invention.

Reference is next made to FIG. 3 which is a detailed circuit diagram showing the self-adjusting window circuit 20. The front end of the window circuit 20 comprises a positive edge detector 50 indicated in broken chain outline. The edge detector 50 comprises three invertors NOT1, NOT2, NOT3 (also indicated by references 52,54,56, respectively), a NAND logic gate 58 and a delay capacitor $C_D$ or 60. The three invertors 52,54,56 and the capacitor 60 form an inverting delay path. The output of this delay path provides one of the inputs to the NAND gate 58. The second input to the NAND gate 58 comprises the composite sync signal 30 (i.e. CSYNC). The third input to the NAND gate 58 is the WINDOW signal 48. (The feedback of the WINDOW signal 48 provides the self-adjusting feature for the window circuit 20 as will be described.) In response, the NAND gate 58 produces a horizontal pulse output signal 62 (or −HP which refers to horizontal pulse). Because the WINDOW signal 48 is used to gate the composite sync signal 30, the pulse signal 62 (or −HP) is only triggered by input rising edges that start at the beginning of a horizontal line in the video field.

Referring still to FIG. 3, the WINDOW signal 48 provides a control signal which is generated by the self-adjusting window circuit 20 as follows. First, assume that the WINDOW signal 48 is high (i.e. open), then in response to the rising edge of the composite sync signal 30 or CSYNC, the NAND gate 58 produces the horizontal pulse signal 62 (or −HP) which sets a "RS-type" flip-flop 64 coupled to the output of the NAND gate 58. The flip-flop 64 has a non-inverting output 66 and an inverting output 68. In response to the −HP signal 62, the flip-flop 64 goes high to produce a "long" horizontal sync pulse LH on the non-inverting output 66. As shown in FIG. 3, the non-inverting output 66 is coupled to an AND logic gate 70. The other input of the AND gate 70 is connected to the output of a short delay circuit 72, e.g. a 0.1H delay, where H is the horizontal line period. The input of the short delay circuit 72 is coupled to the inverting output 68 of the flip-flop 64. The inverting output 68 is also connected to the input of a long delay circuit 74 which produces a delay of 0.3H, for example. The delay circuits 72,74 delay the propagation of the inverted output signal 68 or −LH for 6 and 18 microseconds (i.e. 0.1H and 0.3H) respectively, if the horizontal period H is 63.5 microseconds, as will be described below. The width of the long horizontal sync pulse LH is determined by the long delay circuit 74 (because the output of the long delay circuit 74 is connected to the "R" or reset input of the RS flip-flop 64).

Referring still to FIG. 3, the output of the AND gate 70 is coupled to the base of a first transistor $Q_1$ through a diode $D_4$ which acts as a uni-directional switch. The AND gate 70 produces a short horizontal sync signal 71 or HG. The short horizontal pulse HG comprises a "short" noise-tolerant horizontal sync pulse which is produced once per horizontal scan or line period under the control of the positive edge detector and the WINDOW signal 48. The width of the horizontal sync pulse 71 is determined by the short delay circuit 72 (e.g. 6 microsecond).

As shown in FIG. 3, the base of the transistor $Q_1$ is also coupled to a current source 76 which produces a current $I_6$. The collector or output of the transistor $Q_1$ is connected through a diode $D_5$ to a capacitor $C_1$, which is also coupled to a current source 78. The current source 78 produces a current $I_1$ which is used to charge the capacitor $C_1$ to produce a ramp signal voltage 80 or RAMP. The current $I_1$ produced by the source 78 has a magnitude I. The magnitude I of the current $I_1$ is controlled by the output 49 from the timing control 28, using well-known techniques, for example, a PNP current mirror.

The anode of the diode $D_5$ is also coupled to a second capacitor $C_2$ through a transistor $Q_3$, as shown in FIG. 3. The collector of transistor $Q_3$ is coupled to a current mirror 79 which comprises a diode-connected transistor $Q_4$ coupled to another transistor $Q_5$ as shown in FIG. 3. The transistor $Q_3$ works as an emitter follower to charge the capacitor $C_2$. The second capacitor $C_2$ is charged to produce a MEMORY1 voltage signal 82 (which by the action of transistor $Q_3$ follows the RAMP voltage signal 80). The capacitor $C_2$ is also coupled to a current source 84, which is designed to sink a current $I_2$ (having a magnitude I/25, where I is magnitude of current $I_1$) and a diode $D_1$ and a transistor $Q_{64}$, which operate to discharge the capacitor $C_2$. The capacitor $C_1$ is also coupled to the transistor $Q_{64}$ through a diode-connected transistor $Q_2$ and a diode $D_2$ in order to provide a quick discharge for the capacitor $C_1$ in response to the NOSYNC signal 46 being raised.

As shown in FIG. 3, the output of transistor $Q_5$ is coupled to another current source 86 which sinks a current $I_5$ (having a magnitude I/8). The output of transistor $Q_5$ produces the WINDOW signal 48. Since the WINDOW signal 48 provides one of the inputs to the NAND gate 58, the WINDOW signal 48 will also control the horizontal pulse output signal 62 or −HP.

The capacitor $C_1$ is also coupled to the emitters of transistors $Q_7$ and $Q_8$, as shown in FIG. 3. The bases of transistors $Q_7$ and $Q_8$ are connected to a reference bias voltage 88 or V_COM. The output or collector of transistor $Q_8$ is connected to a sub-circuit 89 which generates the NOSYNC signal 46. The sub-circuits 89 comprises an input transistor $Q_9$ and a RS flip-flop 90 which is implemented using two logic gates NAND2 (or 92) and NAND3 (or 94). In known manner, the two NAND gates 92,94 are cross-coupled to form the RS flip-flop 90. The base or input of transistor $Q_9$ is also connected to a current source 95 which sinks a current $I_3$ (having a magnitude I/8). The output or collector of the transistor $Q_9$ is coupled to a current source 96 which produces a current $I_4$. The output of transistor $Q_9$ is also connected the "set or S" input of the flip-flop 90 and the "reset or R" input of the flip-flop 90 is connected to the inverted composite sync signal 30' or −CSYNC, which is tapped from inverter NOT2. The output of the RS flip-flop 90 is coupled to an inverter 98 and a diode 99 or switch which produces the output signal NOSYNC 46. The operation of the sub-circuit 89 is described in more detail below with reference to FIGS. 6 and 7.

As shown in FIG. 3, the capacitor $C_1$ is also connected to a third capacitor $C_3$ through a transistor $Q_{10}$. The base of transistor $Q_{10}$ is connected to the capacitor $C_1$ and the emitter of the transistor $Q_{10}$ is connected to the capacitor $C_3$. The capacitor $C_3$ is charged to produce a voltage output signal 100 or MEMORY2, which provides one aspect of timing control feature as will be described below.

In response to the long horizontal sync pulse LH appearing on the output 66 of the flip-flop 64, the output of the AND gate 70 goes high to allow the base of transistor $Q_1$ to go high. This causes the transistor $Q_1$ to turn on which pulls the RAMP voltage signal 80 on the capacitor $C_1$ low. Since the RAMP voltage signal 80 is now less than the MEMORY1 voltage signal 82, the transistor $Q_3$ will turn off. If the transistor $Q_3$ is off, then the current mirror comprising transistors $Q_4$ and $Q_5$ will also be off. Since the RAMP voltage signal 80 is less than the reference bias voltage 88 (or V_COM), transistor $Q_7$ is also off and the WINDOW signal 48 will be pulled low by the current Is produced by the current sink 86. This in turn causes the output of the NAND gate 58 to go high thereby defining the rising edge or end of the short horizontal sync pulse 62 or −HP.

It will be appreciated that when the window is closed (i.e. the WINDOW signal 48 goes low), the output of the NAND gate 58 will stay high. Therefore, until the WINDOW signal 48 goes high, the flip-flop 64 cannot be set (i.e. signal LH on output 66) by the CSYNC signal 30 or a noise pulse 16 (FIG. 1).

Referring still to FIG. 3, after the long horizontal sync pulse signal −LH (from output 68 of the flip-flop 64) propagates through the short delay circuit 72 (e.g. 0.1H), the output of the AND gate 70 will go low. This causes the capacitor $C_1$ to begin charging with the current $I_6$ from the current source 78. The capacitor $C_1$ will continue to charge while the flip-flop 64 resets itself via the long delay circuit 74 (e.g. 0.3H). Once the RAMP voltage signal 80 on the capacitor $C_1$ reaches a level which is a base-emitter voltage drop, i.e. $V_{be}$, above the MEMORY1 voltage signal 80, the transistor $Q_3$ will turn on. As described above, the transistor $Q_3$ functions as an emitter follower, which causes the voltage level (i.e. MEMORY1) on the capacitor $C_2$ to increase at the same rate as the voltage level (i.e. RAMP) on the capacitor $C_1$. The current that charges capacitor $C_2$ will flow through transistor $Q_3$ and will also be mirrored by transistors $Q_4$ and $Q_5$. Because this current will be larger than the current $I_5$ produced by the current source 86, the WINDOW signal 48 will go high.

Figure 6:
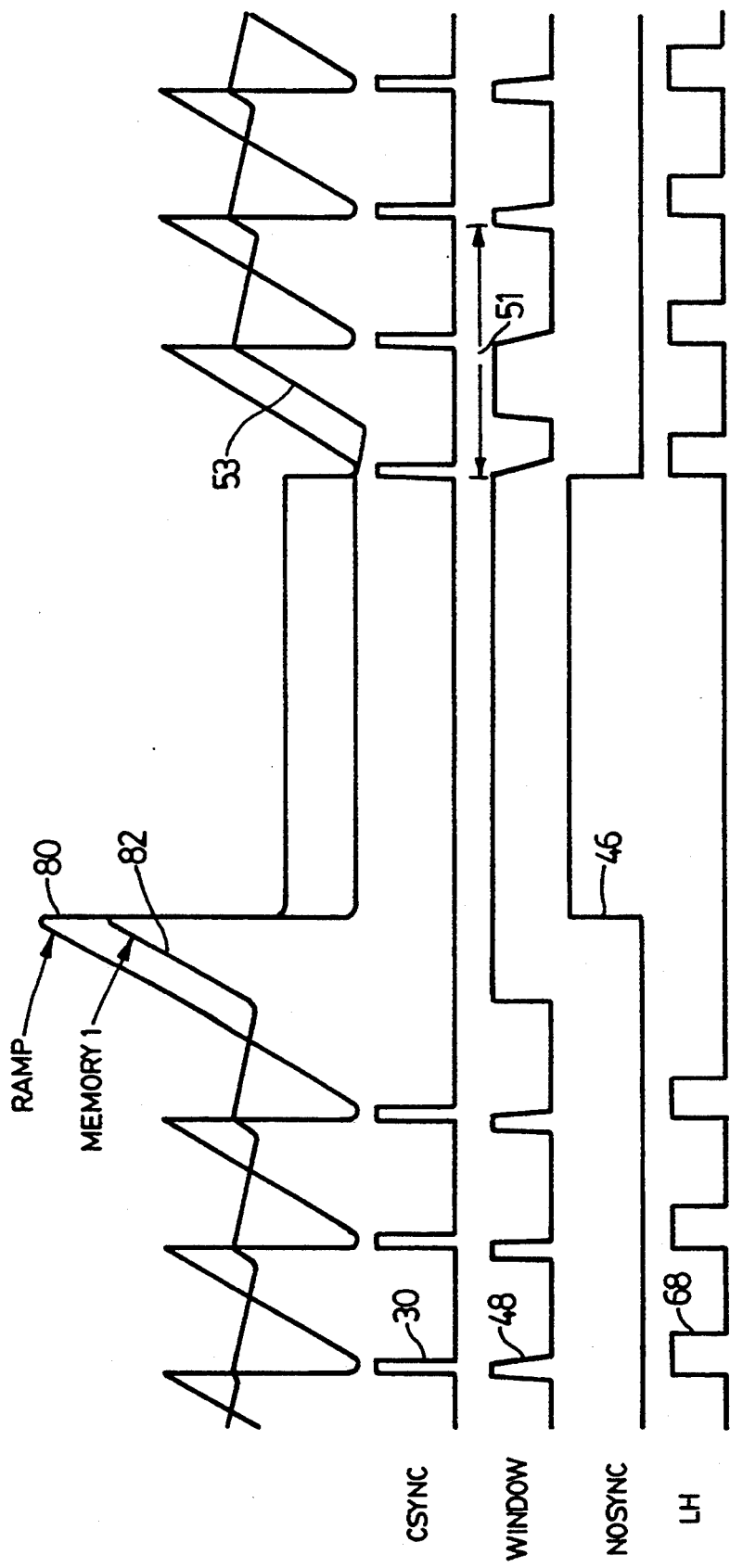
FIG. 6 is a timing diagram which shows the relationship between the various signals when the CSYNC signal is held low.

Reference is next made to FIGS. 4 and 5 which are timing diagrams showing the relationship between the composite video signal 10, the CSYNC, WINDOW, LH, RAMP and MEMORY1 signals. Under normal circumstances, a positive pulse in the CSYNC signal 30 will reset the flip-flop 64 and restart the cycle as shown in FIG. 4. However, if a pulse does not occur before the capacitor $C_1$ has charged to a voltage level $V_{COM} + V_{be}$, the current $I_1$ (having a magnitude I) produced by the current source 78 will be steered through transistors $Q_7$, $Q_8$. The portion of the current $I_1$ that flows through transistor $Q_7$ will be greater than current $I_5$ (having a magnitude I/8) and therefore the WINDOW signal 48 will go high, i.e. open. In addition, the current flowing through transistor $Q_8$ will be greater than current $I_3$ (having a magnitude I/8) and this will cause transistor $Q_9$ to turn on. This in turn sets the RS flip-flop 90 (comprised of NAND2 and NAND3 gates), as long as the CSYNC signal 30 is low. As a result, the NOSYNC signal or flag 46 is then raised which by transistor $Q_{6A}$ resets the RAMP and MEMORY1 voltage signal 80,82. The next pulse in the CSYNC signal 30 will then be able to set the flip-flop 64 (as described above), and after the short delay, i.e. 0.1H, the capacitor $C_1$ will begin to charge again. This sequence of events is shown in FIG. 6. Referring to FIG. 6, it can be seen that it takes a number of horizontal lines (i.e. CSYNC signal pulses) before the WINDOW signal 48 is restored as indicated by reference 51 and reference 53 for the MEMORY1 signal.

Figure 7:
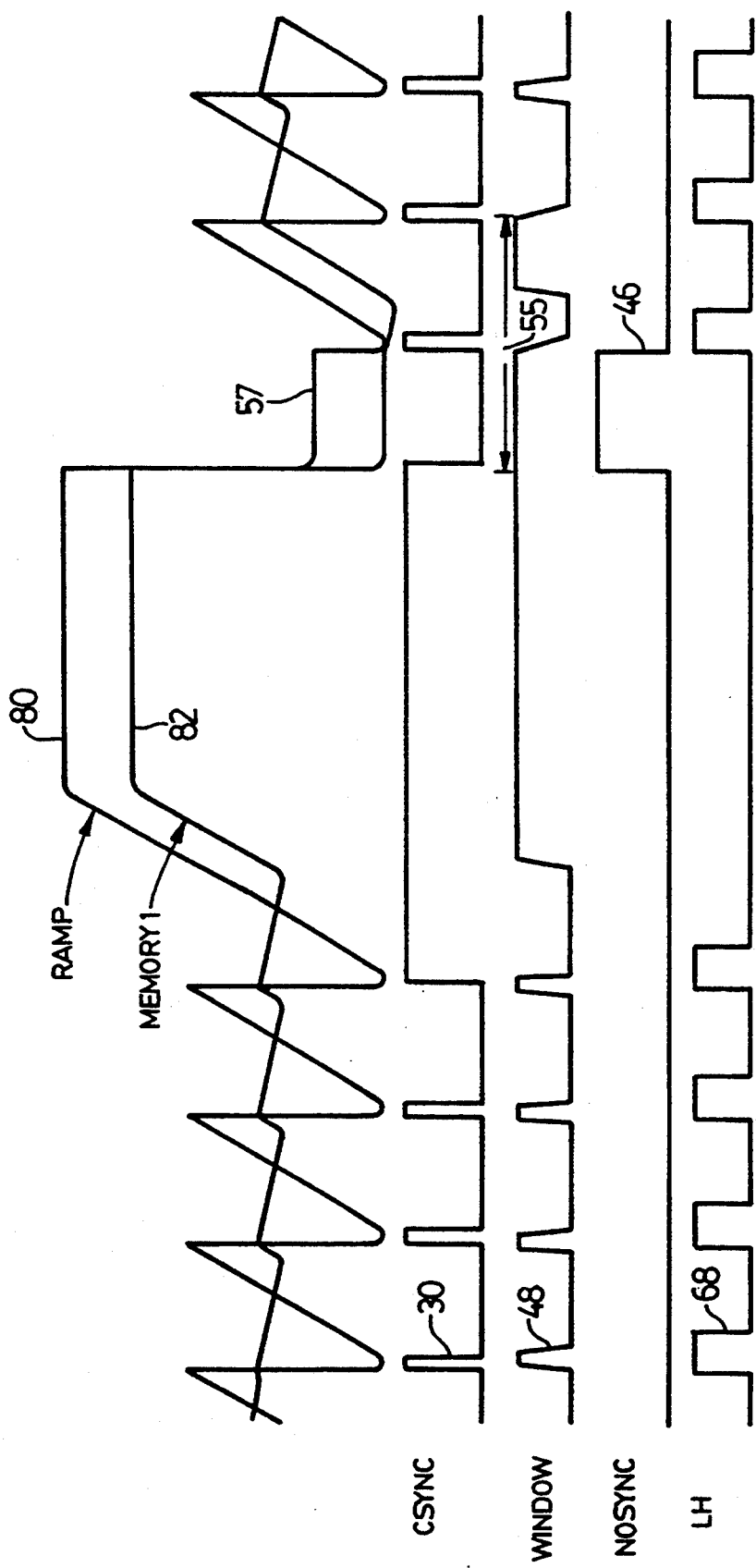
FIG. 7 is a timing diagram showing the relationship between the signals when the CSYNC signal is held high.

Another possible fault condition in the composite video signal 10 can occur if the CSYNC signal 30 is held high for too long as shown in FIG. 7. If the CSYNC signal 30 is held high too long, the capacitor $C_1$ will continue to charge to the voltage level given by $V_{COM} + V_{be}$ which causes transistors $Q_7$ and $Q_8$ to turn on. However, because the CSYNC signal 30 is high, the window circuit 20 will not generate the NOSYNC signal 46. Therefore the RAMP and MEMORY1 voltage signals 80,82 will also saturate at their upper limit as shown in FIG. 7. As soon as the CSYNC signal 30 goes low, the NOSYNC signal 46 will also go high which turns on transistor $Q_{6A}$. This in turn pulls the MEMORY1 and RAMP voltages signals 82,80 low. The next pulse in the CSYNC signal 30 will then reset the flip-flop 64 and after the short delay the capacitor $C_1$ will begin to charge again. As shown in FIG. 7, it takes a number of horizontal line scans (i.e. CSYNC 30 pulses) for the WINDOW signal 48 to stabilize, as indicated by reference 55 and reference 57 for the respective portion of the MEMORY1 signal 82.

Furthermore, when transistor $Q_{6A}$ resets the RAMP memory voltage signal 80 (i.e. capacitor $C_1$), then transistor $Q_{6B}$ will also reset the MEMORY2 signal 100 (i.e. capacitor $C_3$). This follows because the base of transistor $Q_{6B}$ is also coupled to the NOSYNC output flag 46. It also will take a number of horizontal line scans for the MEMORY2 signal 100 to stabilize.

Referring back to FIG. 3, the self-adjusting window circuit 20 also includes a sub-circuit 102 which generates the back porch enable pulse 49 or BPEN. The sub-circuit 102 comprises a RS flip-flop 104 comprising a NAND gate 106 and a NAND gate 108 which are cross-coupled in known manner. The short horizontal sync pulse HG is inverted by inverter 110 to produce an inverted short horizontal sync pulse 112 or −HG which is fed to the "S" or set input of the flip-flop 104. The other input of the flip-flop 104 is connected to the output of a NAND gate 114, which produces an active low clock pulse signal 116 or −CP. The clock pulse signal 116 is a narrow pulse which is produced from the composite sync signal CSYNC being "anded" with the inverted (and delayed) composite sync signal $-CSYNC_{delay}$ (i.e. the output of inverter NOT3). The output (i.e. BPEN) of the flip-flop 104 is anded with the back porch pulse 36 or BP to produce the output back porch pulse output 37 or BP' (see FIG. 2). Through the action of the back porch enable signal BPEN, the back porch output signal 37 or BP' is produced at the horizontal scan rate which will also reduce the effect of noise pulses 16, and the back porch pulse output 37 is shifted half a line during the vertical blanking interval due to the action of the BPEN signal. The timing relationship between the BP signal 36, the BP' output signal 37 and the BPEN signal 49 is shown in FIGS. 4 and 5.

Referring back to FIG. 4, the width of the WINDOW signal 48 is defined by the amount of droop in the MEMORY1 voltage signal 82. The droop can be determined as shown below in equation(1):

$$V_{droop} = \frac{I_2}{C_2} \times T_{scan} \qquad \text{Equation (1)}$$

where:

$V_{droop}$ = The droop in the memory voltage signal
$I_2$ = The memory capacitor discharge current
$C_2$ = The memory capacitor
$T_{scan}$ = The video input scan rate, i.e. the period H It will be appreciated that a feature of the self-adjusting window circuit 20 described above is that it is immune to noise pulses 16 (FIG. 1). Large input noise spikes will not affect the circuit 20 (i.e. set the flip-flop 64) when the "window" is closed, i.e. the WINDOW signal 48 is low. Furthermore, as shown in FIG. 2, the window circuit 20 can be used in a sync separator circuit 18 to produce video timing information such as the back porch pulse 37, the odd/even field flag 35, and the horizontal sync signal 32 that are free from erroneous timing errors due to the impulse noise pulses 16.

Figure 8:
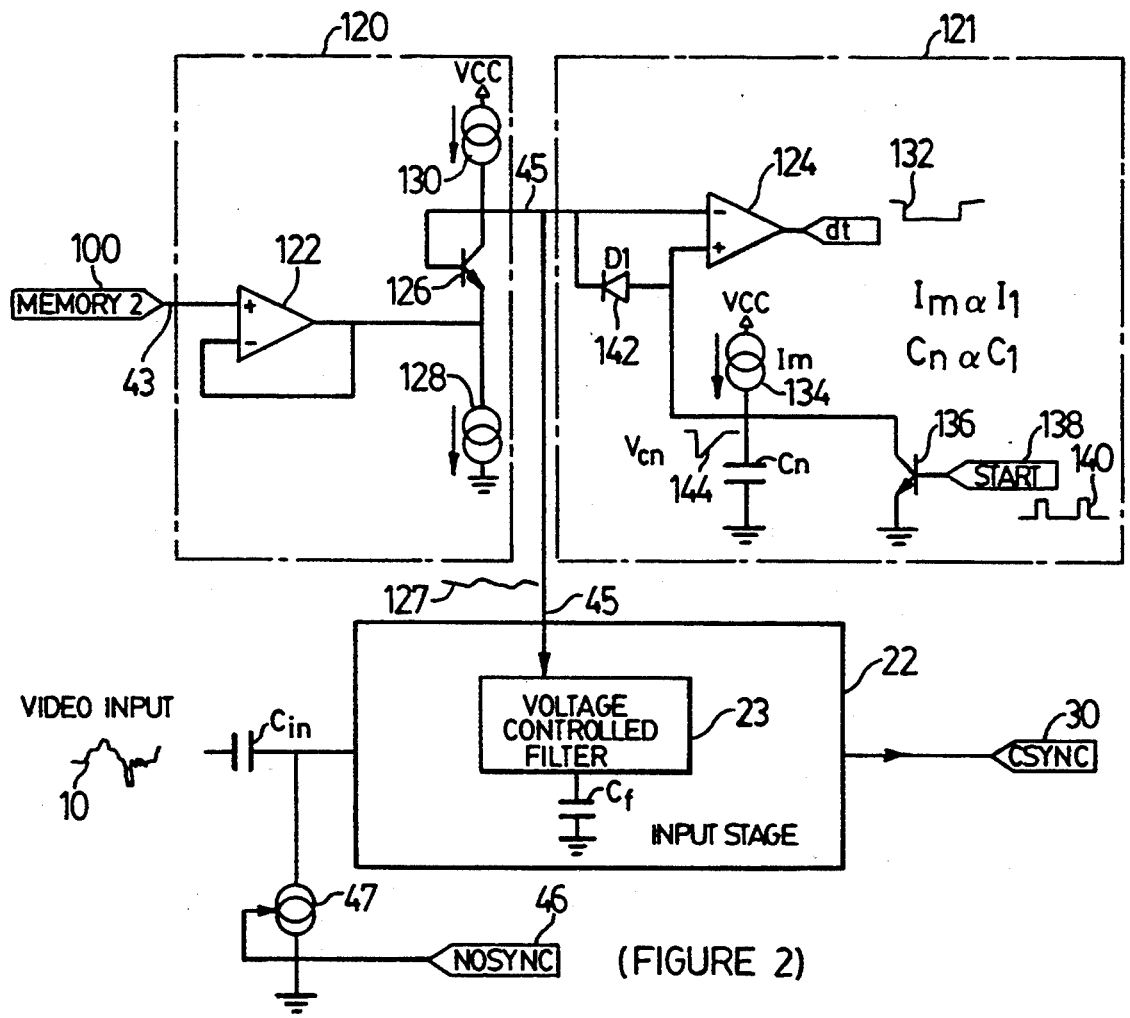
FIG. 8 is a schematic diagram which shows a timing control circuit according to the present invention.

Another aspect of the self-adjusting window circuit 20 is the timing control feature. Referring back to FIG. 3, the self-adjusting window circuit 20 includes a timing control circuit comprising a sub-circuit shown in FIG. 3 in broken chain outline and indicated by reference 21, and another timing control sub-circuit 120 (FIG. 8). Referring to FIG. 3, the timing control sub-circuit 21 comprises the capacitor $C_3$ and the transistor $Q_{10}$. The emitter of transistor $Q_{10}$ is coupled to the capacitor $C_3$ and the base of transistor $Q_{10}$ is coupled to the capacitor $C_1$ (which as described above is charged to produce the RAMP voltage signal 80). The transistor $Q_{10}$ functions as an emitter follower to charge the capacitor $C_3$ to produce the MEMORY2 output voltage signal 100 (which is shown in FIG. 4). The MEMORY2 voltage signal 100 is used in conjunction with the sub-circuit 120 (FIG. 8) to provide an accurate timing delay which is a scaled or multiple version of the input scan rate, i.e. the composite sync signal 30. The MEMORY2 voltage signal 100 is a reproduction of the MEMORY1 voltage signal 82 but with considerably less droop, as shown in FIG. 4.

The MEMORY2 voltage signal 100 can be used to achieve accurate timing control according to the following expression in equation (2):

$$V_{memory2} = \frac{I_1 \times T_{scan} - V_{be}}{C_1} \quad \text{Equation (2)}$$

where $V_{memory2}$ = the voltage on the MEMORY2 capacitor ($C_3$)
$I_1$ = the RAMP charging current
$C_1$ = the RAMP capacitor
$T_{scan}$ = the video input scan rate, i.e. the period H
$V_{be}$ = the base emitter voltage of transistor $Q_{10}$ By fixing the video input scan rate, i.e. $T_{scan}$, and compensating for the temperature coefficient in the base emitter junction of transistor $Q_{10}$, the MEMORY2 voltage signal 100 will be proportional to the term $I_1/C_1$ according to equation (2) above. As will now be described, the MEMORY2 voltage signal 100 or $V_{memory2}$ can be used to achieve an accurate timing delay that is a scaled and multiple version of the input scan rate, which is determined by rewriting equation (2) as follows:

$$dt = \frac{C_n}{I_m} (dv + V_{be}) \quad \text{Equation (3)}$$

where dt = pulse width or time delay
$C_n$ = capacitor that is a scaled version of C1 (FIG. 3) i.e.

$$\frac{C_n}{C_1} \approx K_n,$$

where $K_n$ is a constant
$I_m$ = current that is a scaled version of I1 (current source 78—FIG. 3) i.e.

$$\frac{I_m}{I_1} \approx K_m,$$

where $K_m$ is a constant
dv = voltage change on the capacitor $C_n$
$V_{be}$ = base emitter voltage that matches $V_{be}(Q$-10—FIG. 3) substituting $dv = V_{memory2}$, equation (3) can be rewritten as $$dt = \frac{C_n}{I_m} \left( \frac{I_1}{C_1} T_{scan} - V_{be} + V_{be} \right)$$

$$\therefore dt = \frac{C_n}{C_1} \frac{I_1}{I_m} T_{scan}$$

since $C_n = K_n \times C1$ and $I_m \times K_m \times I1$, where m,n > 0:.
dt = k $T_{scan}$,
where $$k = \frac{K_n}{K_m}$$

Reference is next made to FIG. 8 which shows the sub-circuit 120 and another sub-circuit 121 which are used in conjunction with the MEMORY2 signal 100 generated by the sub-circuit 21 in FIG. 3. For convenience, the sub-circuit 120 is incorporated with the timing control block 28. The sub-circuit 121, on the other hand, can incorporated with the vertical detector circuit 24 (FIG. 2) and/or the back porch detector circuit 26 (FIG. 2). The circuit 120 includes a first operational amplifier 122, and the sub-circuit 121 includes a second operational amplifier 124. The first amplifier 122 is configured as a voltage follower which buffers the MEMORY2 signal 100. The non-inverting input of the operational amplifier 122 is connected to the MEMORY2 signal 100 which appears on the input line 43, and the inverting input is coupled to the output of the operational amplifier 122. The output of the voltage follower 122 (i.e. operational amplifier) is coupled to the non-inverting input of the second amplifier 124 through a diode-connected transistor 126. The diode-connected transistor 126 provides a level shifter to account for the voltage drop $V_{be}$ across the base-emitter junction of transistor $Q_{10}$ in FIG. 3, and also to compensate for temperature effects across the base-emitter junction.

As shown in FIG. 8, the output (i.e. the MEMORY2 signal 100 plus $V_{be}$) of the voltage follower 122 is connected to the emitter of transistor 126 and a current source 128. The output from the diode-connected transistor 126 comprises the output line 45 (FIG. 2). The collector and base of the transistor 126 are tied together and connected to the inverting input of the second amplifier 124 and another current source 130. The two current sources 128,130 are configured to set the operating point for the diode-connected transistor 126.

The output (i.e. collector tied to base) of transistor 126 also provides the output line 45 which is coupled to the voltage controlled filter 23 in the input stage 22. The voltage follower 122 (i.e. first operational amplifier) and diode-connected transistor 126 produce a control signal 127 on output line 45 which corresponds to the MEMORY2 signal 100 plus the voltage $V_{be}$ (of the diode-connected transistor 126) and controls the operation of the voltage controlled filter 23. The voltage controlled filter 23 can be implemented using known techniques as will be within the understanding of one skilled in the art. As shown in FIG. 8, the voltage controlled filter 23 includes a capacitor $C_f$ which has a value proportional to the capacitor $C_1$.

Referring still to FIG. 8, in the sub-circuit 121, the second operational amplifier 124 is configured to operate as a comparator and produces an output signal 130 which is the difference between the signal on the inverting and non-inverting inputs. The comparator 124 (i.e. the sub-circuit 121) produces an output signal 132 which corresponds to "dt" from equation (3) above, as will now be described.

Figure 9:
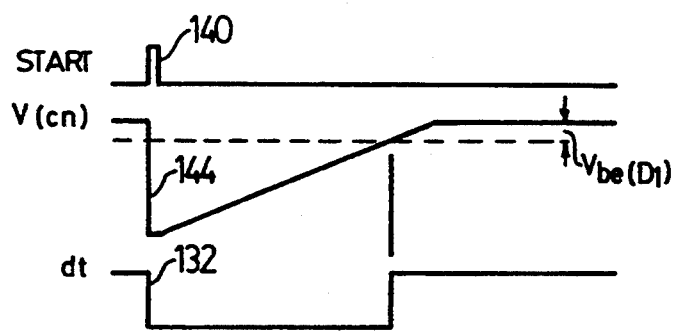
FIG. 9 is a timing diagram which shows the relationship between signals generated by the timing control circuit of FIG. 8.

As shown in FIG. 8, the inverting input of the comparator 124 is connected to the output of the diode-connected transistor 126, i.e. MEMORY2 signal 100 plus $V_{be}$. The non-inverting input of the comparator 124 (i.e.

operational amplifier) is connected to a capacitor $C_n$, a charging current source 134, and a discharging transistor 136. The capacitor $C_n$ has a capacitance which is proportional to the capacitor $C_1$ (see Equation (3) above). The current source 134 is configured to source a current $I_m$ which charges the capacitor $C_n$. The magnitude of current $I_m$ is selected to be proportional to the current $I_1$ (see description for Equation (3) above). The transistor 136 is configured to sink a collector current which is selected to quickly discharge the capacitor $C_n$. The base of transistor 136 provides a control input 138 which is responsive to a START signal 140. In response to the START signal 140, the transistor 136 is turned on and the collector current discharges the capacitor $C_n$. As shown in FIG. 9, the START signal 140 comprises a pulse having a width or duration which is sufficient to discharge the capacitor $C_n$. The START signal 140 can be derived from the CSYNC signal 30 (in order to produce a timing control signal which is synchronous with the start of a horizontal scan). The comparator 124 also has a diode 142 which is connected across the inverting and non-inverting inputs to limit or clamp the voltage on the capacitor $C_n$.

In operation, the capacitor $C_n$ will be charged by the current source 134 to a voltage level $V(cn)$ which is shown as signal 144 in FIGS. 8 and 9. The comparator 124 will produce a negative going output pulse 132 (i.e. dt) when the control signal 127 (i.e. the MEMORY2 signal plus $V_{be}$) exceeds the voltage level $V_{(cn)}$ on the capacitor $C_n$. (The MEMORY2 signal 100 is coupled to the inverting input of the comparator 124 through the voltage follower 122 and diode-connected transistor 126.) As shown in FIG. 9, the output 132 of the comparator 124 will remain low until the capacitor $C_n$ is charged to a level which exceeds the control signal 127, i.e. the MEMORY2 signal 100 plus $V_{be}$. When the diode 142 turns on, the inverting input will be a diode voltage drop or $V_{be}$ lower than the non-inverting input, thereby causing the output of the comparator 124 to go high as shown in FIG. 9. The output 132 of the comparator 124, i.e. the signal dt, will remain high until the next START signal pulse 140 is received.

From the foregoing description, it will be appreciated that the MEMORY2 signal 100 comprises a delay compensation voltage which is used by the timing control circuits 120 and 121 to produce a delay time signal (i.e. dt). A feature of the delay time signal 130 or "dt" produced by the timing control circuit 120 is that the signal remains relatively constant over the manufacturing tolerances of the integrated circuit capacitors. Therefore, the delay time voltage signal dt is available to other circuit blocks (e.g. the vertical detector circuit 24 and the back porch detector circuit 26 in the sync separator 18) to provide an accurate time signal Tcomp according to the following expression:

$$T_{comp} = (V_{comp} * C_{ic})/I$$

where:
  I = a constant current which is supplied external to the system
  $C_{ic}$ = an auxiliary memory capacitor
  $V_{comp}$ = the delay voltage signal dt In the above expression, the current I is constant and supplied by a source external to the system, and variations in the value of the capacitor $C_{ic}$ (i.e. the integrated circuit capacitor) are compensated by inverse variations in the voltage signal $V_{comp}$ (i.e. the compensation voltage), such that the delay time $T_{comp}$ remains relatively constant over manufacturing tolerances of the capacitor $C_{ic}$.

The present invention may be embodied in other specific forms without departing from the spirit or essential characteristics thereof. Therefore, the presently disclosed embodiments are considered to be illustrative and not restrictive, the scope of the invention being indicated by the appended claims rather than the foregoing description, and all changes which come within the meaning and range of equivalency of the claims are therefore intended to be embraced therein.

We claim:

1. A self-adjusting window circuit for use with a monolithic integrated circuit, said self-adjusting window circuit comprising:
   (a) input port means for receiving an input sync pulse signal having a sequence of pulses appearing at a predetermined scan rate;
   (b) positive edge detector means coupled to said input port means and having means for producing a pulse output signal in response to detection of a pulse in said input sync pulse signal;
   (c) latching means for latching said pulse output signal and producing a charging control signal;
   (d) a charging stage coupled to said latching means and having means responsive to said charging control signal for producing a window control signal in response to said pulse being detected; and
   (e) feedback means for coupling said window control signal to said positive edge detector means and said positive edge detector means having means for disabling and enabling operation of said positive edge detector in response to said window control signal.

2. The self-adjusting window circuit as claimed in claim 1, further including indicator means for producing a flag output signal in response to a fault condition in said sync pulse signal, said indicator means being coupled to said charging stage and having means responsive to a ramp voltage signal produced by said charging stage.

3. The self-adjusting window circuit as claimed in claim 2, wherein said indicator means includes means for detecting the absence of a pulse in said input sync pulse signal for a predetermined time and producing said flag output signal in response thereto.

4. The self-adjusting window circuit as claimed in claim 1, wherein said latching means includes short delay means and short pulse width means for generating a short sync pulse signal synchronous with said input sync signal and the pulse width being determined by said short delay means.

5. The self-adjusting window circuit as claimed in claim 4, wherein said short pulse width means produces the pulse width which is 0.1 the scan period of said input sync pulse signal.

6. The self-adjusting window circuit as claimed in claim 1, wherein said latching means includes long delay means and long pulse width means for generating a long sync pulse signal synchronous with said input sync signal and the pulse width being determined by said long delay means.

7. The self-adjusting window circuit as claimed in claim 6, wherein said long pulse width means produces a pulse width which is 0.3 the scan period of said input sync pulse signal.

8. The self-adjusting window circuit as claimed in claim 1, further including timing control, means for producing a constant delay time output signal, said timing control means being coupled to said charging stage and being responsive to said charging control signal.

9. The self-adjusting window circuit as claimed in claim 1, wherein said charging stage comprises first and second capacitors, said first capacitor being coupled to said latching means and having means for charging said first capacitor in response to said charging control signal, said second capacitor being coupled to said first capacitor and said charging means through an emitter-follower transistor, so that the charging of said second capacitor follows the charging of said first capacitor.

10. The self-adjusting window circuit as claimed in claim 1 or 9, wherein said positive edge detector means comprises an AND logic gate having an input for receiving said input sync pulse signal, an input for receiving said window control signal and an input which is coupled to a delay inverter for receiving an inverted and delayed input sync pulse signal, and said AND logic gate having an output coupled to said latching means for latching the output of said AND gate for producing said charging control signal.

11. The self-adjusting window circuit as claimed in claim 1, further including means for producing a back porch output signal at the predetermined scan rate of said input sync signal, said means for producing a back porch signal having an input for receiving said input sync signal and another input for receiving said charging control signal.

12. The self-adjusting window circuit as claimed in claim 1 in combination with a video input stage for a video sync separator, said video input stage having means for operating at an input signal offset and discharge current means for restoring said input signal offset, and said self-adjusting window circuit having means for generating a recovery control signal and said discharge current means being responsive to said recovery control signal.

13. The self-adjusting window circuit as claimed in claim 6 in combination with a video sync separator having a vertical detector circuit for producing a vertical sync pulse signal and gated latch means, said gated latch means having an input for said vertical sync pulse signal and an input for said long pulse sync signal for producing and odd and even field flag output signal in response to said long pulse sync signal and said vertical sync pulse signal.

14. The self-adjusting window circuit as claimed in claim 3, wherein said indicator means includes means responsive to an input sync pulse signal having no pulses over a predetermined period of time and means for producing a signal output flag in response to the absence of said pulses in the input sync signal.

15. The self-adjusting window circuit as claimed in claim 8, wherein said timing control means comprises means for producing a delay compensation signal and memory means for storing said delay compensation signal and output means for outputting said delay compensation signal.

* * * * *